United States Patent [19]

Ishimitsu et al.

[11] Patent Number: 4,555,126
[45] Date of Patent: Nov. 26, 1985

[54] VEHICLE SUSPENSION SYSTEM

[75] Inventors: Ikuo Ishimitsu; Toshimichi Tokunaga; Takeshi Tanaka; Yoshiaki Anan, all of Hiroshima, Japan

[73] Assignee: Mazda Motor Corporation, Japan

[21] Appl. No.: 542,652

[22] Filed: Oct. 17, 1983

[30] Foreign Application Priority Data

Oct. 18, 1982 [JP] Japan .................. 57-182367
Oct. 18, 1982 [JP] Japan .................. 57-182368

[51] Int. Cl.$^4$ ............................. B60G 17/00
[52] U.S. Cl. ..................... 280/707; 280/703; 280/714
[58] Field of Search ............. 280/702, 703, 707, 714

[56] References Cited

U.S. PATENT DOCUMENTS

| 2,247,749 | 7/1941 | De Venel | 280/707 |
| 3,321,210 | 5/1967 | Delchev | 280/707 |
| 3,603,612 | 9/1971 | Hill et al. | 280/707 |
| 3,608,925 | 9/1971 | Murphy | 280/707 |

FOREIGN PATENT DOCUMENTS

| 109008 | 1/1980 | Japan . | |
| 149815 | 9/1983 | Japan | 280/707 |

Primary Examiner—Joseph F. Peters, Jr.
Assistant Examiner—Kenneth R. Rice
Attorney, Agent, or Firm—Murray, Whisenhunt and Ferguson

[57] ABSTRACT

An improved vehicle suspension system capable of providing at all times a desirable maneuvering characteristic variable in response to changes in the angle of steering. The suspension system includes front wheel suspension assemblies for resiliently suspending the front wheels of the vehicle and rear wheel suspension assemblies for resiliently suspending the rear wheels of the vehicle. The front wheel suspension assemblies and/or the rear wheel suspension assemblies have a variable suspension characteristic which is controlled to vary in response to a steering angle exceeding a predetermined level in a manner such that the steering characteristic of the vehicle during steering operation is changed in a direction toward an oversteer characteristic as compared with the steering characteristic during non-steering operation. Specifically, the suspension characteristic of the front wheel suspension assemblies and/or the rear wheel suspension assemblies is changed to make the ratio of the suspension rate of each front wheel suspension assembly to that of each rear wheel suspension assembly smaller during steering operation than during non-steering operation. Also, the steering characteristic of the vehicle may be further controlled such that the understeer characteristic of the vehicle is stronger at high speed than at low speed.

18 Claims, 7 Drawing Figures

F I G. I

VEHICLE SUSPENSION SYSTEM

BACKGROUND OF THE INVENTION

1. Field of the Invention

This invention relates to a vehicle suspension system, and more specifically, to a suspension system of the type which has a variable suspension characteristic controlled in response to the traveling conditions of a vehicle.

2. Description of the Prior Art

There has been known a vehicle suspension system of the type referred to above in which, as shown for example in Japanese Unexamined Utility Model Publication No. 55(1980)-109008, the suspension characteristic of a suspension system is varied in response to the traveling speed of the vehicle so as to provide good maneuverability at all times. This serves to provide an intensified understeer characteristic during high speed traveling of the vehicle and a neutralsteer or a weak oversteer characteristic during low speed traveling so that there is always obtained highly stabilized maneuverability variable in response to changes in vehicle speed.

However, there are various factors other than the vehicle speed which require a change in maneuverability. For example, the magnitude of the steering angle has a close relation to the required maneuverability, and when the steering wheel is turned through a large angle, a weak understeer characteristic is desirable. In other words, it is desired that the understeer characteristic be weakened at a large angle of steering but be intensifies at a small angle of steering. Therefore, it is not possible to ensure satisfactory traveling stability only by controlling the maneuverability in accordance with the vehicle speed.

It is preferred that, for example, when the steering wheel is suddenly turned to greatly change the traveling direction of the vehicle, the understeer characteristic be weakened to approach the oversteer characteristic so that steering response is improved to make the steerable wheels sharply respond to the turning motion of the steering wheel. However, when the vehicle is being driven to run straight forward without any turning motion of the steering wheel, a strong understeer characteristic is preferred because this provides good straight-running capability. An understeer characteristic particularly facilitates correction of the heading or running attitude of the vehicle when it is affected by external disturbances, and if the understeer characteristic is decreased, the straight-running stability is reduced to make the vehicle dangerous during travel at high speed. Accordingly, it is desirable that the understeer characteristic be at all times changed to the optimal intensity with variation in the angle of steering.

SUMMARY OF THE INVENTION

In view of the above, it is an object of the present invention to provide a novel and improved vehicle suspension system which is capable of providing at all times a desirable maneuvering characteristic variable in response to changes in the angle of steering.

In order to achieve the above object, the suspension system according to the present invention is characterized in that the suspension characteristics are controlled to vary in response to changes in the angle of steering so as to provide a desirable maneuvering characteristic at all times.

Specifically, the suspension system of the present invention is further characterized in that it comprises a set of front wheel suspension assemblies for resiliently suspending the front wheels of a vehicle, a set of rear wheel suspension assemblies for resiliently suspending the rear wheels of the vehicle, at least one of the set the front wheel suspension assemblies and the set of rear wheel suspension assemblies having a variable suspension characteristic, an adjusting means for changing the suspension characteristic of the at least one set of wheel suspension assemblies, a steering angle sensor operable to detect the angle of steering for generating a steering signal upon detection of a steering angle exceeding a predetermined level, and a controller adapted to send out, upon receipt of the steering signal from the steering angle sensor, a control signal to the adjusting means so as to change the suspension characteristic of the at least one set of wheel suspension assemblies in a manner such that the steering characteristic of the vehicle during steering operation is changed in a direction toward an oversteer characteristic as compared with the steering characteristic during non-steering operation.

It should be noted that the statement "to make the ratio of the suspension rate of each front wheel suspension assembly to that of each rear wheel suspension assembly is smaller during steering operation of the vehicle than in the non-steering operation thereof" includes the following three cases:

(a) The suspension rates of the respective front wheel suspension assemblies are decreased with the suspension rates of the respective rear wheel suspension assemblies held constant during steering operation of the vehicle;

(b) Contrary to (a) above, the suspension rates of the respective rear wheel suspension assemblies are increased with the suspension rates of the respective front wheel suspension assemblies held constant;

(c) Both of the suspension rates of the respective front wheel suspension assemblies and those of the respective rear wheel suspension assemblies are changed in the opposite senses, that is, the suspension rates of the respective front wheel suspension assemblies are decreased whereas the suspension rates of the respective rear wheel suspension assemblies are increased.

In this connection, it is a matter of course that during non-steering operation of the vehicle, the suspension rates of the respective front and rear wheel suspension assemblies are changed in the sense opposite the sense in which they are changed in the respective cases referred to above.

In the description which follows, the suspension rates of the respective front wheel suspension assemblies are represented by $CF+KF$ and those of the respective rear wheel suspension assemblies by $CR+KR$ for the sake of simplicity, where CF is the damping rate of the front wheel suspension assemblies, KF is the spring rate of the front wheel suspension assemblies, CR is the damping rate of the rear wheel suspension assemblies, and KR is the spring rate of the rear wheel suspension assemblies. Thus, since the ratio of $CF+KF$ to $CR+KR$ is represented as $CF+KF/CR+KR$, the above three cases (a), (b) and (c) are all construed to mean that the ratio of $CF+KF/CR+KR$ during steering operation of a vehicle is made smaller than the ratio of $CF+KF/CR+KR$ during non-steering operation thereof. This is represented in Table 1 below.

TABLE 1

|  | during steering | during non-steering |
| --- | --- | --- |
| suspension ratio (CF + KF/CR + KR) | large | small |
| maneuvering characteristic | strong understeer | weak understeer |

In this connection, it is to be noted that when the ratio of CF+KF/CR+KR is decreased, the understeer characteristic is weakened so as to make the steerable wheels of the vehicle respond more sharply to the turning motion of the steering handle. According to the present invention, the ratio of CF+KF/CR+KR is varied in response to the magnitude of the steering angle so as to provide a desirable understeer characteristic at all times while ensuring good maneuverability as well as improved running stability of the vehicle.

The above and other objects, features and advantages of the present invention will become apparent from the following detailed description of a preferred embodiment when taken in conjunction with the accompanying drawings.

DESCRIPTON OF THE PREFERRED EMBODIMENTS

Figure 1:
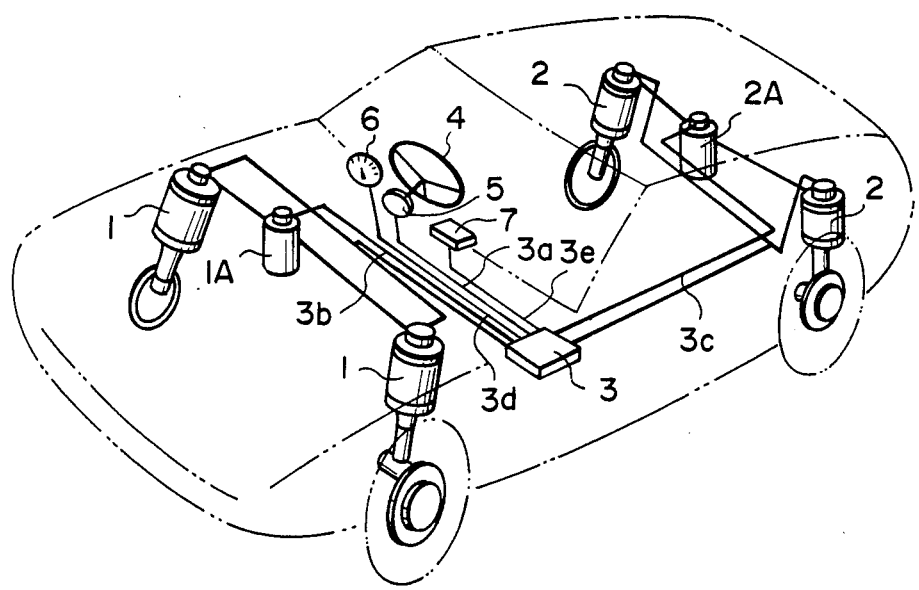
FIG. 1 is a schematic view of an automotive vehicle equipped with a suspension system constructed in accordance with the principles of the present invention.
Figure 2:
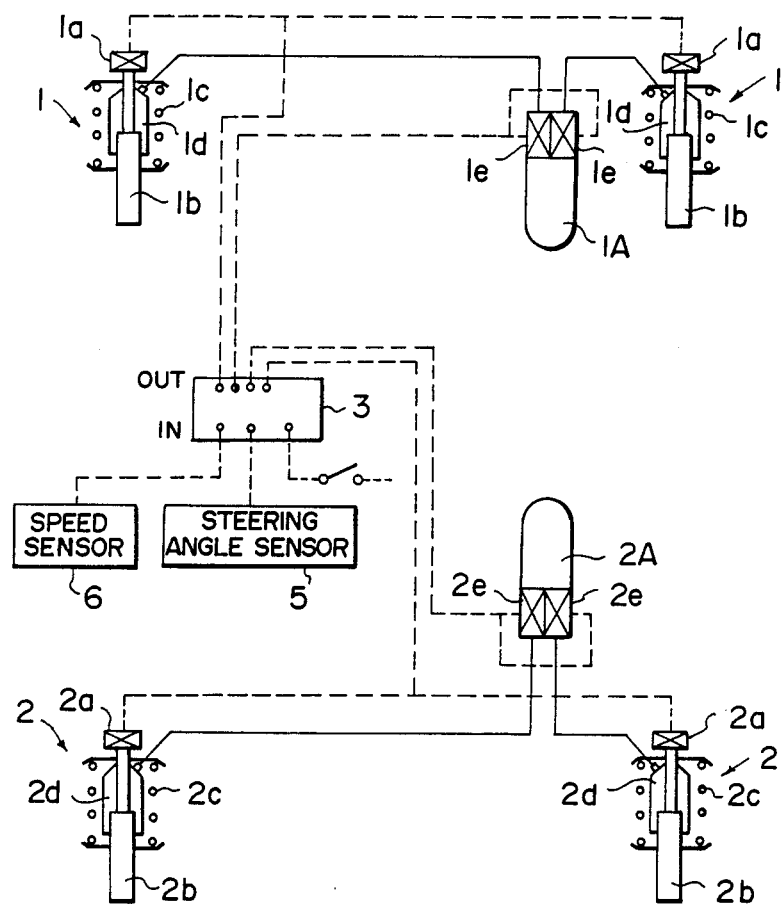
FIG. 2 is a diagrammatic illustration of the suspension system of the present invention.

Referring to the drawings, FIG. 1 schematically illustrates an automotive vehicle equipped with a suspension system constructed in accordance with the principles of the present invention, and FIG. 2 diagrammatically illustrates the essential parts of the suspension system. The inventive suspension system includes, in the embodiment illustrated, a pair of front wheel suspension assemblies 1, 1 and a pair of rear wheel suspension assemblies 2, 2, each of the suspension assemblies having a damper unit with a variable damping rate and a spring unit with a variable spring rate or constant arranged in parallel relation with the damper unit. The damping rates of the damper units and the spring rates of the spring units are respectively controlled by means of a common controller 3 in an appropriate manner as will be described in detail later. The controller 3 is adapted to receive an output signal from a steering angle sensor 5 through a lead wire 3a, which steering angle sensor is provided in association with a steering wheel 4 for the purpose of detecting the magnitude of the steering angle, and to send out a control signal to the respective front and rear wheel suspension assemblies 1, 1, 2, 2 through respective lead wires 3b, 3c. Also, in this embodiment, the controller 3 is fed with the signal output of a speedometer 6 through a lead wire 3d, and is connected through a lead wire 3e to a changeover switch 7 for selecting automatic or manual operation.

As shown in FIG. 2, each of the suspension assemblies 1, 1, 2, 2 comprises an actuator 1a, 1a 2a or 2a in the form of electromagnetic means, a damper unit 1b 1b, 2b or 2b adapted to be changed its damping rate by means of its associated actuator, a coiled suspension spring 1c 1c, 2c or 2c arranged in surrounding relation to its associated damper unit for resilient support thereof, a pneumatic spring unit 1d, 1d, 2d or 2d arranged in parallel relation to its associated damper unit and having a pneumatic chamber, and an accumulator 1A or 2A having a pair of actuators 1e, 1e or 2e, 2e in the form of electromagnetic means and being in fluid communication with the pneumatic chambers of its associated pneumatic spring units 1d, 1d or 2d, 2d through the respective actuators 1e, 1e or 2e, 2e for changing the spring rates KF, KR of the respective pneumatic spring units. Upon receipt of a signal from the steering angle sensor 5, the controller 3 sends out output signals to the respective electromagnetic actuators 1a, 1a, 2a, 2a for the front and rear wheel damper units 1b, 1b, 2b, 2b on the left-hand and right-hand sides of the vehicle so that the respective actuators 1a, 1a, 2a, 2a, having received the output or control signals from the controller 3, control the associated damper units 1b, 1b, 2b, 2b in such a manner as to make their damping forces or rates suited to the steering angle of the steering wheel. The controller 3 also sends out output signals to the respective electromagnetic actuators 1e, 1e, 2e, 2e of the accumulators 1A, 2A for the front and rear wheel pneumatic spring units 1d, 1d, 2d, 2d so that the respective actuators 1e, 1e, 2e, 2e, having received the output or control signals from the controller 3, control the associated pneumatic spring units 1d, 1d, 2d, 2d so as to decrease their spring rates or constants.

For example, when the steering angle sensor 5 detects an angle of steering of the steering wheel exceeding a predetermined level and puts out a signal (e.g., a voltage of a magnitude greater than a predetermined value) indicative of a large angle of steering, the controller 3 acts, upon receipt of the output signal from the steering angle sensor 5, to energize the electromagnetic actuators 1a, 1a, 2a, 2a and/or the electromagnetic actuators 1e, 1e, 2e, 2e in a manner such that the damping rates CF of the damper units 1b, 1b and/or the spring rates KF of the spring units 1d, 1d for the front wheels are decreased while the damping rates CR of the damper units 2b, 2b and/or the spring rates KR of the spring units 2d, 2d for the rear wheels are increased, thus reducing the ratio of CF+KF/CR+KR.

Figure 3:
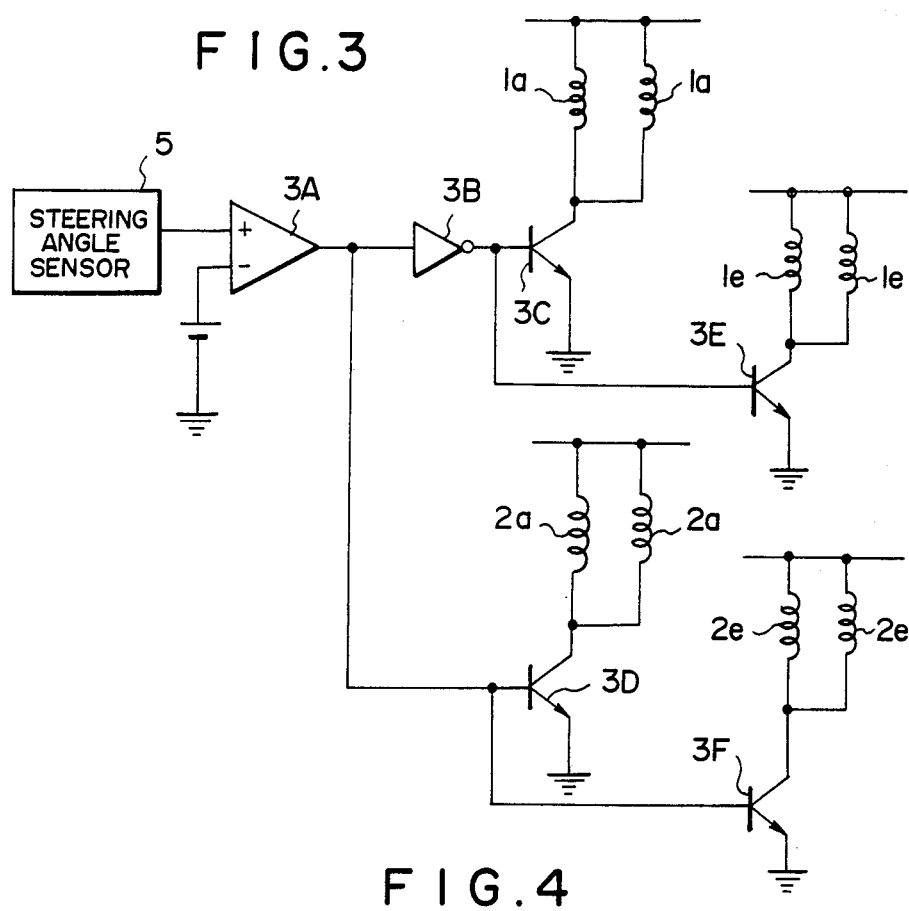
FIGS. 3 to 5 are circuit diagrams respectively illustrating different examples of a controller for controlling the operation of the suspension system as shown in FIG. 2.

A concrete example of such a controller 3 is shown in FIG. 3 in which the signal output of the steering angle sensor 5 is sent to a comparator 3A of the controller 3 for comparison with a reference signal representative of a preset angle of steering, and when the output signal of the steering angle sensor 5 exceeds a predetermined level or the reference signal, the comparator 3A generates a high output signal H, which is directed through an inverter 3B to the base of a transistor 3C connected at its collector to a pair of parallel-arranged solenoids, respectively, of the electromagnetic actuators 1a, 1a for the front wheel damper units 1b, 1b and to the base of a transistor 3E connected at its collector to a pair of parallel-arranged solenoids, respectively, of the electromagnetic actuators 1e, 1e for the front wheel pneumatic spring units 1d, 1d so that the base-emitter voltages of the respective transistors 3C, 3E are lowered to render these transistors non-conductive. At the same time, the high output signal H of the comparator 3A is also sent directly to a pair of parallel-arranged solenoids, respectively, of the electromagnetic actuators 2a, 2a for the rear wheel damper units 2b, 2b and to the base of a transistor 3F connected at its collector to a pair of parallel-arranged solenoids, respectively, of the electromagnetic actuators 2e, 2e for the rear wheel pneumatic spring units 2d, 2d so that the base-emitter voltages of the respective transistors 3D, 3F are raised to drive these transistors into a conductive state. Accordingly, the solenoids of the electromagnetic actuators 1a, 1a, 1e, 1e, connected to the collectors of the transistors 3C, 3E, respectively, are de-energized to decrease both the damping rates or force CF of the front wheel damper units 1b, 1b and the spring rates or constants KF of the front wheel pneumatic spring units 1d, 1d, whereas the solenoids of the electromagnetic actuators 2a, 2a, 2e, 2e, connected to the collectors of the transistors 3D, 3F, respectively, are energized to increase both the damping rates or forces CR of the rear wheel damper units 2b, 2b and the spring rates or constants KR of the rear wheel pneumatic spring units 2d, 2d, whereby the ratio of CF+KF/CR+KR is decreased in an appropriate manner so as to weaken the understeer characteristic (standard understeer).

On the other hand, under the straight-running condition of the vehicle, the output of the steering angle sensor 5 is lower than the predetermined level or the aforementioned reference signal representative of the preset angle of steering and hence the comparator 3A has a low output signal L so that the transistors 3C, 3E, connected through the inverter 3B to the output side of the comparator 3A, are driven into conductive state to energize the solenoids of the front wheel actuators 1a, 1a, 1e and 1e, thus increasing both the damping rates or forces CF of the front wheel damper units 1b, 1b and the spring rates or constants KF of the front wheel pneumatic spring units 1d, 1d, while at the same time the transistors 3D, 3F, connected directly to the output side of the comparator 3A, are rendered non-conductive to de-energize the solenoids of the rear wheel actuators 2a, 2a, 2e and 2e, thereby reducing both the damping rates or forces CR of the rear wheel damper units 2b, 2b and the spring rates or constants KF of the rear wheel pneumatic spring units 2d, 2d. As a result, the ratio of CF+KF/CR+KR is increased to intensify the understeer characteristic.

In this connection, it is to be noted that, as shown in FIGS. 1 and 2, the output signal of the vehicle speed sensor in the form of a speedometer 6 is fed, along with the output signal of the steering angle sensor 5, to the controller 3 so as to control the suspension characteristic of the vehicle in response to the speed of the vehicle in addition to the angle of steering as detected by the steering angle sensor 5. The controlling of the suspension characteristic in response to the vehicle speed is considered to include the following two cases.

(i) The understeer characteristic is controlled to increase during high speed traveling of the vehicle as is well known in the art; that is, the understeer characteristic is controlled in response to the vehicle speed V in the direction opposite the direction in which it is controlled in response to the steering angle $\theta$.

(ii) The understeer characteristic is controlled, upon steering operation, to decrease in proportion to the vehicle speed, that is, in proportion to the angle of steering $\theta$ multiplied by the vehicle speed squared $V^2$ in order to suppress the rolling motion of the vehicle caused by centrifugal forces developing upon steering operation.

Figure 4:
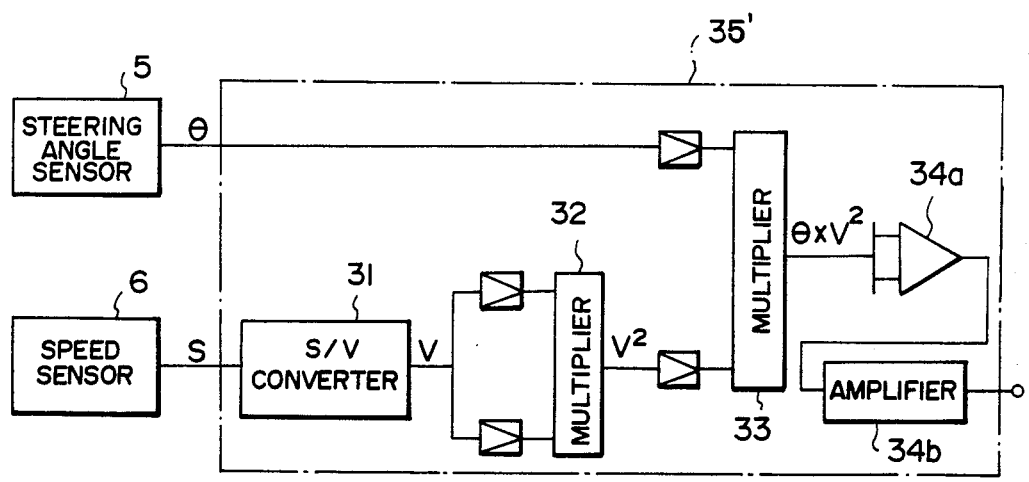
Figure 5:
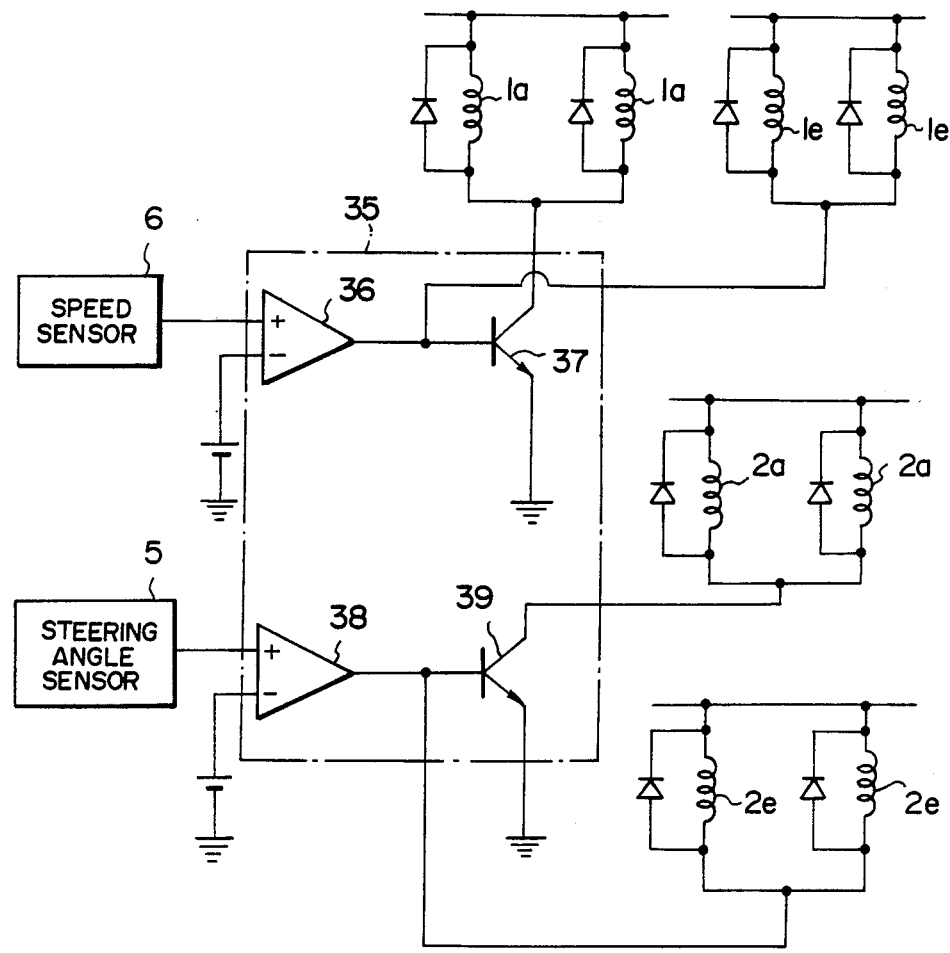

Although the output of the vehicle speed sensor 6 is not utilized in the example as shown in FIG. 3, FIGS. 4 and 5 illustrate other examples in which the output of the vehicle speed sensor 6 is used to control the understeer characteristic in the manners referred to above in cases (i) and (ii). Specifically, the case (i) is illustrated in FIG. 5 and the case (ii) in FIG. 4.

It should be noted that the changeover switch 7 is adapted to be selectively operated to enable, in addition to the above-described automatic control, manual control of the steering characteristic when it is desired to change the suspension characteristic or the ratio of CF+KF/CR+KR arbitrarily in a manual fashion.

Now, a second embodiment of the controller is described with reference to FIG. 4. In this embodiment, the output signal $\theta$ of the steering angle sensor 5 and the output signal S of the vehicle speed sensor 6 are fed to the controller 35' wherein the output signal S is converted by means of a converter 31 into a voltage V which is then squared by a multiplier 32 and multiplied by the output signal $\theta$ of the steering angle sensor 5 in a multiplier 33. The output signal $\theta \times V^2$ of the multiplier 33 is fed to the electromagnetic actuators 1a, 1a, 2a, 2a for the front and rear wheel damper units 1b, 1b, 2b, 2b and/or the electromagnetic actuators 1e, 1e, 2e, 2e for the front and rear wheel pneumatic spring units 1d, 1d, 2d, 2d through a buffer 34a and a multiplier 34b whereby the suspension characteristic is controlled in accordance with the quantity of $\theta \times V^2$ in a manner such that the ratio of the front wheel suspension rate (CF+KF) to the rear wheel suspension rate (CR+KR) is varied in inverse proportion to the quantity of $\theta \times V^2$. In this manner, the suspension characteristic can be controlled by the steering angle while taking into account the influence of inertial force proportional to the square of the vehicle speed.

Next, reference is made to a third example in which the suspension characteristic is controlled in accordance with a combination of the vehicle speed and the steering angle. In this example, the suspension characteristic is controlled such that basically, the ratio of CF+KF/CR+KR is decreased at the time of steering operation and at the same time the ratio of CF+KF/CR+KR is varied in accordance with the vehicle speed. That is, the ratio of CF+KF/CR+KR is made greater at high speed than at low speed so as to intensify the understeer characteristic at high speed. This relation is shown in Table 2 below.

TABLE 2

|  | vehicle speed | front suspension | rear suspension | understeer characteristic | vehicle characteristic |
|---|---|---|---|---|---|
| straight running | low | soft | soft | moderate | comfort |
|  | high | hard | soft | strong | stability |
| steering operation | low | soft | hard | weak | high response |
|  | high | hard | hard | moderate | moderate response and stability |

In Table 2, it is to be understood that "soft" and "hard" mean a low suspension rate (damping rate plus spring rate) and a high suspension rate, respectively. Therefore, Table 2 indicates that the suspension characteristics of the rear wheel suspension assemblies are changed from a "soft" mode to a "hard" mode at the time of steering operation irrespective of the vehicle speed so as to weaken the understeer characteristic, and that the suspension characteristics of the front wheel suspension assemblies are changed from a "soft" mode to a "hard" mode to intensify the understeer characteristic when the vehicle speed increases from a low level to a high level irrespective of whether the vehicle runs straight or is steered to turn.

FIG. 5 illustrates the circuit diagram of a controller embodying the third example as set forth above. As clearly seen from FIG. 5, the output signal of the vehicle speed sensor 6 is fed to a first comparator 36 of the controller 35 so as to drive a first transistor 37, connected to the output side of the first comparator 36, into or out of conduction, whereby the electromagnetic actuators 1a, 1a for the front wheel damper units 1b, 1b and the electromagnetic actuators 1e, 1e for the front wheel pneumatic spring units 1d, 1d, connected to the first transistor 37, are controlled accordingly. Specifically, the first comparator 36 has a high output signal H at high speed of the vehicle so that the first transistor 37 is saturated to energize the electromagnetic actuators 1a, 1a, 1e and 1e, thus putting the front wheel suspension assemblies 1, 1 into a harder mode of operation. On the other hand, the output signal of the steering angle sensor 5 is fed to a second comparator 38, which produces an output signal for controlling the operation of a second transistor 39 so that the electromagnetic actuators 2a, 2a for the rear wheel damper units 2b, 2b and the electromagnetic actuators 2e, 2e for the rear wheel pneumatic spring units 2d, 2d, connected to the second transistor 39, are controlled accordingly. Namely, when the vehicle is steered to turn, the second comparator 38 has a high output signal H which serves to drive the second transistor 39 into a conductive state so that the electromagnetic actuators 2a, 2a, 2e, 2e are energize to cause the rear wheel suspension assemblies 2, 2 to change from their soft mode of operation to their hard mode of operation.

Now, a concrete example of the suspension assembly having a variable suspension characteristic will be described in further detail with reference to FIGS. 6 and 7.

Figure 6:
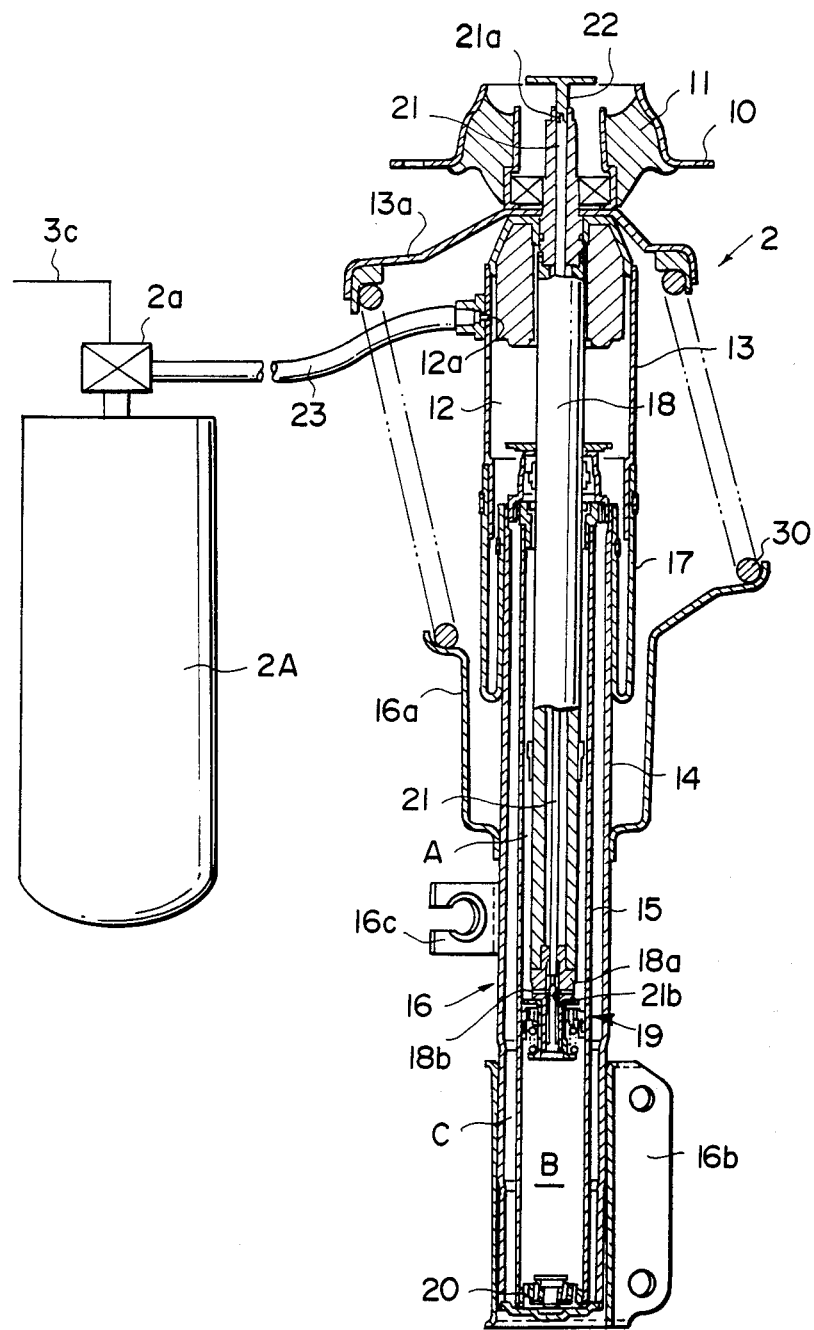
FIG. 6 is a vertical cross section illustrating an example of a suspension assembly usable in the suspension system of the present invention.

As shown in FIG. 6, the suspension assembly of the present invention, generally indicated at reference numeral 2, comprises an upper cylindrical casing 13 fixedly secured at its top end to a part 10 of the body frame of a vehicle through an elastic member 11 and defining therein a pneumatic chamber 12, a lower casing 16 arranged at the lower end of the upper casing 13 for telescopic movement relative thereto, the lower casing 16 being formed of an outer cylinder 14 and an inner cylinder 15 disposed therein, a bellows 17 connecting the upper end of the lower casing 16 with the lower end of the upper casing 13 in an air-tight manner, a piston rod 18 extending coaxially through the interior spaces of the upper and lower casings 13, 16 for vertical sliding movement relative to the inner cylinder 15, a main valve 19 fixedly mounted on the lower end of the piston rod 18, and a bottom valve 20 fixedly attached to the lower end of the inner cylinder 15. The hydraulic chamber defined in the inner cylinder 15 is divided by the main valve 19 into an upper chamber A and a lower chamber B, and a reservoir chamber C defined between the outer and inner cylinders 14, 15 is in fluid communication at its upper end with the hydraulic chamber A, and at its lower end with the hydraulic chamber B, respectively. Vertically extending through the center of the piston rod 18 is a control rod 21 which has its upper end 21a engaged with a rotary key 22 for rotation therewith, the rotary key being turned by external force. As clearly seen in FIG. 7, in the lower end portion of the control rod 21 there is provided an orifice 21b communicating with a plurality of radial communication apertures 18b which are formed radially in the lower end portion 18a of the piston rod 18. The communication between the orifice 21b and the radial communication apertures 18b in the lower end portion 18a of the piston rod 18 is controlled to be established or blocked by turning motion of the control rod 21. The construction of the lower end portion of the piston rod 18 including the lower end portion 21b of the control rod 21 as well as the main valve 19 and the bottom valve 20 will be described in more detail later with reference to FIG. 7.

The relative vertical movement between the upper casing 13 and the lower casing 16 is resiliently absorbed under the combined action of the coiled suspension spring 30 (in FIG. 6) or 2c (in FIG. 2), arranged between an upper spring seat 13a secured to the upper casing 13 and a lower spring seat 16a secured to the lower casing 16, and of the pneumatic spring unit including the pneumatic chamber 12 defined in the upper casing 13. Fixedly attached to the outer surface of the lower casing 16 are a pair of brackets 16b, 16c which serve the purpose of mounting thereon a wheel-supporting structure (not shown) including a wheel hub rotatably supporting a wheel. In this manner, the wheel is mounted on a part 10a of the body frame of the vehicle for vertical movement relative thereto by means of the suspension assembly 2, that is, the body frame is suspended and resiliently supported by the wheel in a vertically movable manner.

Through the peripheral wall of the pneumatic chamber 12 there is formed an aperture 12a to which is connected one end of an air pipe 23 for the purpose of placing the pneumatic chamber 12 into communication with an accumulator 2A. The air pipe 23 is connected at the other end thereof to the accumulator 2A through an electromagnetic actuator 2a in the form of a solenoid valve, which is in electrical connection with a lead wire 3c extending from the aforementioned controller 3.

The solenoid valve 2a is operated to open or close by an output signal from the controller 3, as described before, so that the associated pneumatic chamber 12 is brought into or out of communication with the accumulator 2A, thus changing the spring rate or constant of the associated pneumatic spring unit in the decreasing or increasing sense.

In this connection, it is to be noted that in the suspension assembly 2 constructed as described above, the hydraulic chambers A, B and C in the lower casing 16, the communication passages for communicating these hydraulic chambers A, B and C with each other, and the main and bottom valves 19, 20 jointly constitute a damper unit having a variable damping force or rate. In the following, the construction of such a damper unit will be described in detail with reference to FIG. 7.

Figure 7:
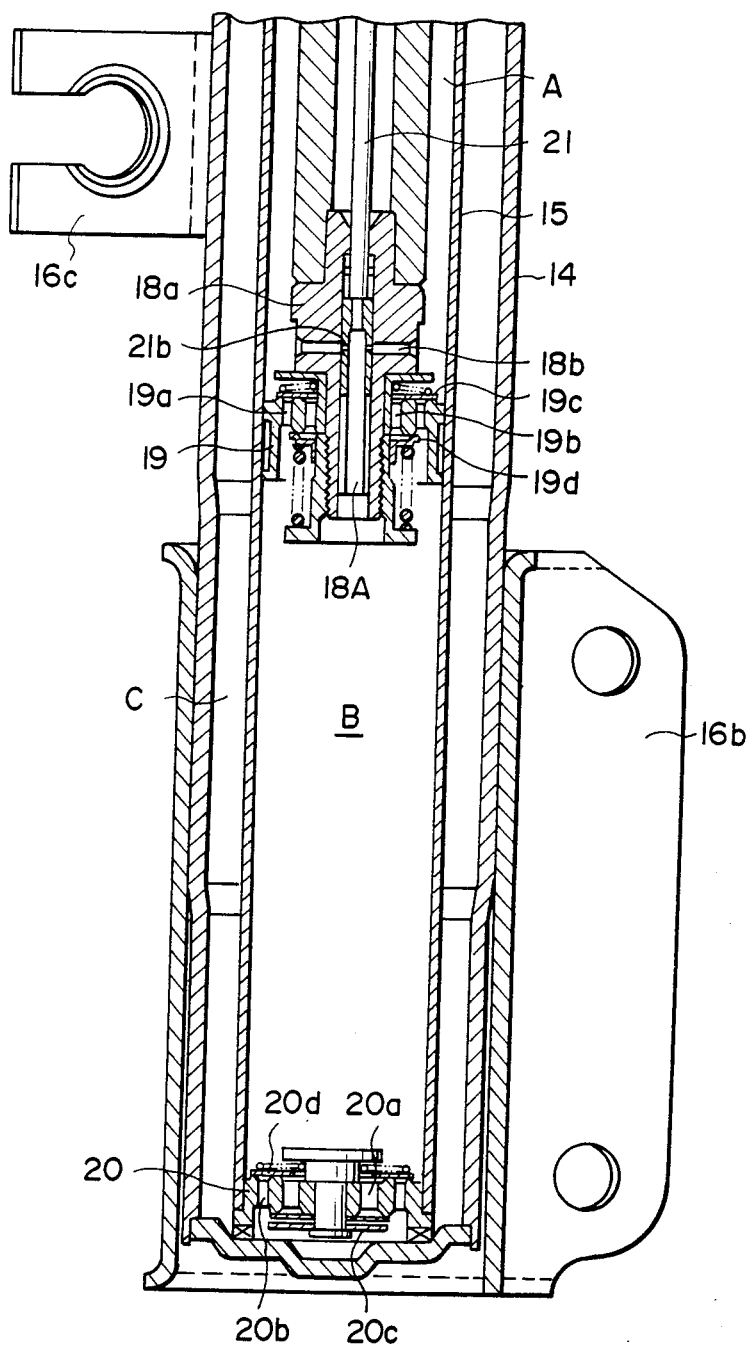
FIG. 7 is a fragmentary vertical cross-sectional view illustrating in detail and on an enlarged scale the essential parts of the suspension assembly as shown in FIG. 6.

As illustrated in FIG. 7, the main valve 19 is provided with a contraction-damping orifice 19a having a valve 19c and an extension-damping orifice 19b having a valve 19d. Similarly, the bottom valve 20 is provided with a contraction-damping orifice 20a having a valve 20c and an extension-damping orifice 20b having a valve 20d. The hydraulic chambers A and B, which are defined in the inner cylinder 15 on the opposite sides of the main valve 19, are normally in fluid communication with each other only through the orifices 19a, 19b. During rapid starting or rapid acceleration of the vehicle, the control rod 21 is automatically turned to place the orifice 21b in the lower end of the control rod 21 into communication with the radial communication apertures 18b in the lower end 18a of the piston rod 18 so that the hydraulic chambers A and B come into communication with each other by way of the radial communication apertures 18b, the orifice 21b and an axial bore 18A extending from the interior space of the orifice 21b to the chamber B. Consequently, the total area of the flow passages between the chambers A and B is enlarged to decrease the damping force or rate of the damper unit.

It is to be understood that the control rod 21 is caused to turn by rotating the rotary key 22 engaged in the top end 21a of the control rod 21, for example, through an angle of 90 degrees, whereby the communication between the orifice 21b and the radial communication apertures 18b is controlled in an on-off manner. Also, the rotary key 22 is controllably driven to rotate under the action of an electromagnetic means such as a solenoid so as to change the damping force or rate of the damper unit.

It should be appreciated that in case where the damper unit of the above construction is used with the rear wheel suspension assembly, it is adjusted such that, when the vehicle is steered to turn, the orifice 21b in the control rod 21 is placed out of communication with the radial communication apertures 18b so as to reduce the cross-sectional area of the flow passages between the chambers A and B to provide a relatively large damping force or rate. In this condition, when the steering angle sensor 5 detects a large angle of steering in excess of a predetermined level, the orifice 21b is brought into communication with the radial communication apertures 18b so that the cross-sectional area of the above flow passages is thereby enlarged to decrease the damping force or rate. On the other hand, where the damper unit is applied to the front wheel suspension assembly, the orifice 21b is adjusted such that it is placed in communication with the radial communication apertures 18b during steering operation of the vehicle, and out of communication therewith during straight running of the vehicle. Further, when the damper units are applied to both the front and rear wheel suspension assemblies, the two types of damper units as described above may be used without any modification or change.

As will be clear from the foregoing, the present invention provides the following remarkable advantages. The suspension system of the present invention employs suspension assemblies each having a variable suspension characteristic which can be automatically controlled to vary in response to a change in the angle of steering of the vehicle in a manner such that the ratio of the front wheel suspension rate to the rear wheel suspension rate is decreased. This serves to maintain the understeer characteristic at a desired intensity, which would otherwise be reduced at the time of non-steering operation, whereby it is possible to ensure stable running of the vehicle at all times irrespective of changes in the steering angle.

It should be noted that though in the embodiment as illustrated, the magnitude of the damping force or rate of the damper unit is changed in two stages including a high and a low level, it can be changed in a continuous manner by continuously changing the cross-sectional areas of the orifice 21b and the communication apertures 18b. Also, if the steering angle sensor 5 is so constructed as to generate an output signal in the form of a continuous analogue signal, it will be possible to continuously control the damping force or rate in response to a subtle change in vehicle acceleration, and, needless to say, the magnitude of the damping force or rate of the damper unit can be controlled to change discretely in three or more stages.

While a preferred embodiment of the present invention has been shown and described, it will be apparent to those skilled in the art that various modifications and changes may be made therein without departing from the spirit or the scope of the appended claims.

We claim:

1. A vehicle suspension system comprising a set of front wheel suspension assemblies for resiliently suspending the front wheels of a vehicle, a set of rear wheel suspension assemblies for resiliently suspending the rear wheels of the vehicle, at least one of said set of front wheel suspension assemblies and said set of rear wheel suspension assemblies having a variable suspension characteristic, an adjusting means for changing the suspension characteristic of the at least one of said sets of wheel suspension assemblies, a steering angle sensor operable to detect the angle of steering for generating a steering signal upon detection of a steering angle exceeding a predetermined level, and a controller adapted to send out, upon receipt of the steering signal from said steering angle sensor, a control signal to said adjusting means so as to change the suspension characteristic of the at least one of said sets of wheel suspension assemblies in a manner such that the steering characteristic of the vehicle during steering operation is changed in a direction toward an oversteer characteristic as compared with the steering characteristic during non-steering operation.

2. A vehicle suspension system as set forth in claim 1, wherein the suspension characteristic of the at least one set of wheel suspension assemblies is changed such that the suspension rates of said front wheel suspension assemblies and those of said rear wheel suspension assemblies are changed relative to each other.

3. A vehicle suspension system as set forth in claim 2, wherein at least one set of wheel suspension assemblies each comprise a damper unit having a variable damping rate, and said adjusting means comprises a damping-rate adjuster for changing the damping rates of said damper units, said controller being operable to control, upon receipt of the output signal from said steering angle sensor, said damping-rate adjuster in a manner such that the ratio of the damping rate of each of said front wheel damper units to that of each of said rear wheel damper units is smaller during steering operation than during non-steering operation.

4. A vehicle suspension system as set forth in claim 3, wherein the damping rates of said front wheel damper units are decreased upon steering of the vehicle.

5. A vehicle suspension system as set forth in claim 3, wherein the damping rates of said rear wheel damper units are increased upon steering of the vehicle.

6. A vehicle suspension system as set forth in claim 5, wherein the damping rates of said front wheel damper units are decreased upon steering of the vehicle.

7. A vehicle suspension system as set forth in claim 3, wherein said front and rear wheel suspension assemblies each comprise a damper unit having a variable damping rate, and said adjusting means comprises a damping-rate adjuster for changing the damping rates of said damper units, said controller being operable to control, upon receipt of the output signal from said steering angle sensor, said last-named damping-rate adjuster in a manner such that the ratio of the damping rate of each of said front wheel damper units to that of each of said rear wheel damper units is smaller during steering operation than during non-steering operation.

8. A vehicle suspension system as set forth in claim 7, wherein said front and rear wheel suspension assemblies each further comprises a spring means having a variable spring rate.

9. A vehicle suspension system as set forth in claim 2, wherein at least one set of wheel suspension assemblies each comprise a spring unit having a variable spring rate and arranged in parallel with its associated damper unit, and said adjusting means comprises a spring-rate adjuster for changing the spring rates of said spring units, said controller being operable to control, upon receipt of the output signal from said steering angle sensor, said spring-rate adjuster in a manner such that the ratio of the spring rate of each of said front wheel spring units to that of each of said rear wheel spring units is smaller during steering operation than during non-steering operation.

10. A vehicle suspension system as set forth in claim 9, wherein said spring units each comprise a pneumatic spring unit.

11. A vehicle suspension system as set forth in claim 9, wherein the spring rates of said front wheel spring units are decreased upon steering of the vehicle.

12. A vehicle suspension system as set forth in claim 9, wherein the spring rates of said rear wheel spring units are increased upon steering of the vehicle.

13. A vehicle suspension system as set forth in claim 12, wherein the damping rates of said front wheel damper units are decreased upon steering of the vehicle.

14. A vehicle suspension system as set forth in claim 2, further comprising a speed sensor for detecting the speed of the vehicle and generating a speed signal, said controller being adapted to receive both the steering signal from said steering angle sensor and the speed signal from said speed sensor for generating a control signal.

15. A vehicle suspension system as set forth in claim 14, wherein said controller acts to control the operation of said adjusting means in a manner such that the understeer characteristic of the vehicle is stronger at high speed traveling of the vehicle than at low speed traveling thereof.

16. A vehicle suspension system as set forth in claim 15, wherein said suspension assemblies each comprise a damper unit having a variable damping rate.

17. A vehicle suspension system as set forth in claim 15, wherein said suspension assemblies each comprise a spring unit having a variable spring rate and arranged in parallel with its associated damper unit.

18. A vehicle suspension system as set forth in claim 2, wherein said controller acts to control the operation of said adjusting means in a manner such that the steering characteristic of the vehicle has a strong understeer characteristic during non-steering operation and a weak understeer characteristic during steering operation.

* * * * *